(12) United States Patent
Herrington

(10) Patent No.: US 10,592,797 B2
(45) Date of Patent: *Mar. 17, 2020

(54) METAL CONTACTLESS TRANSACTION CARD

(71) Applicant: Capital One Services, LLC, McLean, VA (US)

(72) Inventor: Daniel Herrington, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,754

(22) Filed: Mar. 2, 2018

(65) Prior Publication Data

US 2019/0065927 A1 Feb. 28, 2019

Related U.S. Application Data

(63) Continuation of application No. 15/687,236, filed on Aug. 25, 2017, now Pat. No. 9,940,571.

(51) Int. Cl.
*G06K 19/07* (2006.01)
*G06K 19/077* (2006.01)
*G06K 19/02* (2006.01)

(52) U.S. Cl.
CPC ....... *G06K 19/07773* (2013.01); *G06K 19/02* (2013.01); *G06K 19/0772* (2013.01); *G06K 19/07722* (2013.01); *G06K 19/07771* (2013.01)

(58) Field of Classification Search
CPC .................. G06K 19/07773; G06K 19/07722

USPC .................................................. 235/487, 492
See application file for complete search history.

(56) References Cited

U.S. PATENT DOCUMENTS

| | | |
|---|---|---|
| D651,237 S | 12/2011 | Mullen et al. |
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |

(Continued)

FOREIGN PATENT DOCUMENTS

| | | |
|---|---|---|
| CN | 205750845 U | 11/2016 |
| WO | 2004063977 A2 | 7/2004 |
| WO | 2014113765 A1 | 7/2014 |

OTHER PUBLICATIONS

Co-pending U.S. Appl. No. 15/687,236, filed Aug. 25, 2017, entitled Metal Contactless Transaction Card, by Daniel Herrington, 39 pages.

(Continued)

*Primary Examiner* — Daniel A Hess
(74) *Attorney, Agent, or Firm* — Harrity & Harrity, LLP

(57) ABSTRACT

A transaction card for communicating data relating to a transaction may include a metal layer; a backing layer; and/or a radio frequency (RF) antenna layer positioned between the metal layer and the backing layer, where the RF antenna layer includes an RF antenna that may facilitate communicating the data relating to the transaction wirelessly via an RF signal, and the metal layer includes a plurality of holes to limit eddy currents in the metal layer to a threshold density, where the plurality of holes may extend from a top surface of the metal layer to a bottom surface of the metal layer, and the eddy currents may be caused by the RF signal.

21 Claims, 11 Drawing Sheets

(56) References Cited

U.S. PATENT DOCUMENTS

| | | |
|---|---|---|
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| 8,393,547 B2 * | 3/2013 | Kiekhaefer ............ G06K 19/02 235/487 |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 9,940,571 B1 * | 4/2018 | Herrington ...... G06K 19/07722 |
| 2011/0031319 A1 * | 2/2011 | Kiekhaefer ............ G06K 19/02 235/492 |
| 2013/0126622 A1 | 5/2013 | Finn et al. |
| 2014/0104133 A1 | 4/2014 | Finn et al. |

OTHER PUBLICATIONS

Extended European Search Report for Application No. EP18190405.3, dated Jan. 15, 2019, 8 pages.

* cited by examiner

ND DESCRIPTION

METAL CONTACTLESS TRANSACTION CARD

RELATED APPLICATION

This application is a continuation of U.S. patent application Ser. No. 15/687,236, filed Aug. 25, 2017, the disclosure of which is incorporated herein by reference.

BACKGROUND

Contactless transactions involve use of transaction cards (e.g., a credit card, a debit card, a gift card, an automated teller machine (ATM) card, a rewards card or client loyalty card, and/or the like) and/or devices (e.g., a smart transaction card, a smartphone, and/or the like) in transactions to pay for products or services at transaction terminals (e.g., point of sale (PoS) terminals) of individuals or businesses engaged in the sale of goods or services without a need for the transaction cards or devices to contact the transaction terminals (e.g., via a swipe of a card reader or an insertion into a chip reader). In some instances, radio frequency (RF) antennas and/or radio frequency identification (RFID) tags may be included in contactless transaction cards to provide identification information associated with the transaction cards (e.g., an account identifier, account information, a payment token, and/or the like). Accordingly, consumers may utilize the transaction cards or devices with an RF antenna and/or RFID tag by waving the transaction cards or devices over or near contactless transaction terminals to pay the individuals or businesses.

SUMMARY

According to some implementations, a transaction card for communicating data relating to a transaction may include a metal layer, a backing layer, and/or a radio frequency (RF) antenna layer positioned between the metal layer and the backing layer, where the RF antenna layer includes an RF antenna that may facilitate communicating the data relating to the transaction wirelessly via an RF signal, and the metal layer includes a plurality of holes to limit eddy currents in the metal layer to a threshold density, where the plurality of holes may extend from a top surface of the metal layer to a bottom surface of the metal layer, and the eddy currents may be caused by the RF signal.

According to some implementations, transaction card for communicating data relating to a transaction, the transaction card may include a first metal layer comprising a first plurality of holes to limit eddy currents in the first metal layer to a first threshold density, where the first plurality of holes extending from a top surface of the first metal layer to a bottom surface of the first metal layer; a second metal layer comprising a second plurality of holes to limit eddy currents in the second metal layer to a second threshold density, where the second plurality of holes extending from a top surface of the second metal layer to a bottom surface of the second metal layer; and a radio frequency (RF) antenna layer positioned between the first metal layer and the second metal layer, where the RF antenna layer includes an RF antenna to facilitate communicating the data relating to the transaction wirelessly via an RF signal, and where the eddy currents in the first metal layer or the eddy currents in the second metal layer may be caused by the RF signal.

According to some implementations, a transaction card for communicating data relating to a transaction, the transaction card may include a metal layer; a backing layer; and/or a radio frequency (RF) antenna layer positioned between the metal layer and the backing layer, where the RF antenna layer includes an RF antenna to facilitate communicating the data relating to the transaction wirelessly via an RF signal, where the metal layer comprises a plurality of holes to limit eddy currents in the metal layer to a threshold density, where the plurality of holes may from a top surface of the metal layer to a bottom surface of the metal layer, where a first subset of the plurality of holes that overlap the RF antenna are positioned more densely than a second subset of the plurality of holes that do not overlap the RF antenna, and where the eddy currents may be caused by the RF signal.

DETAILED DESCRIPTION

Figure 1A:
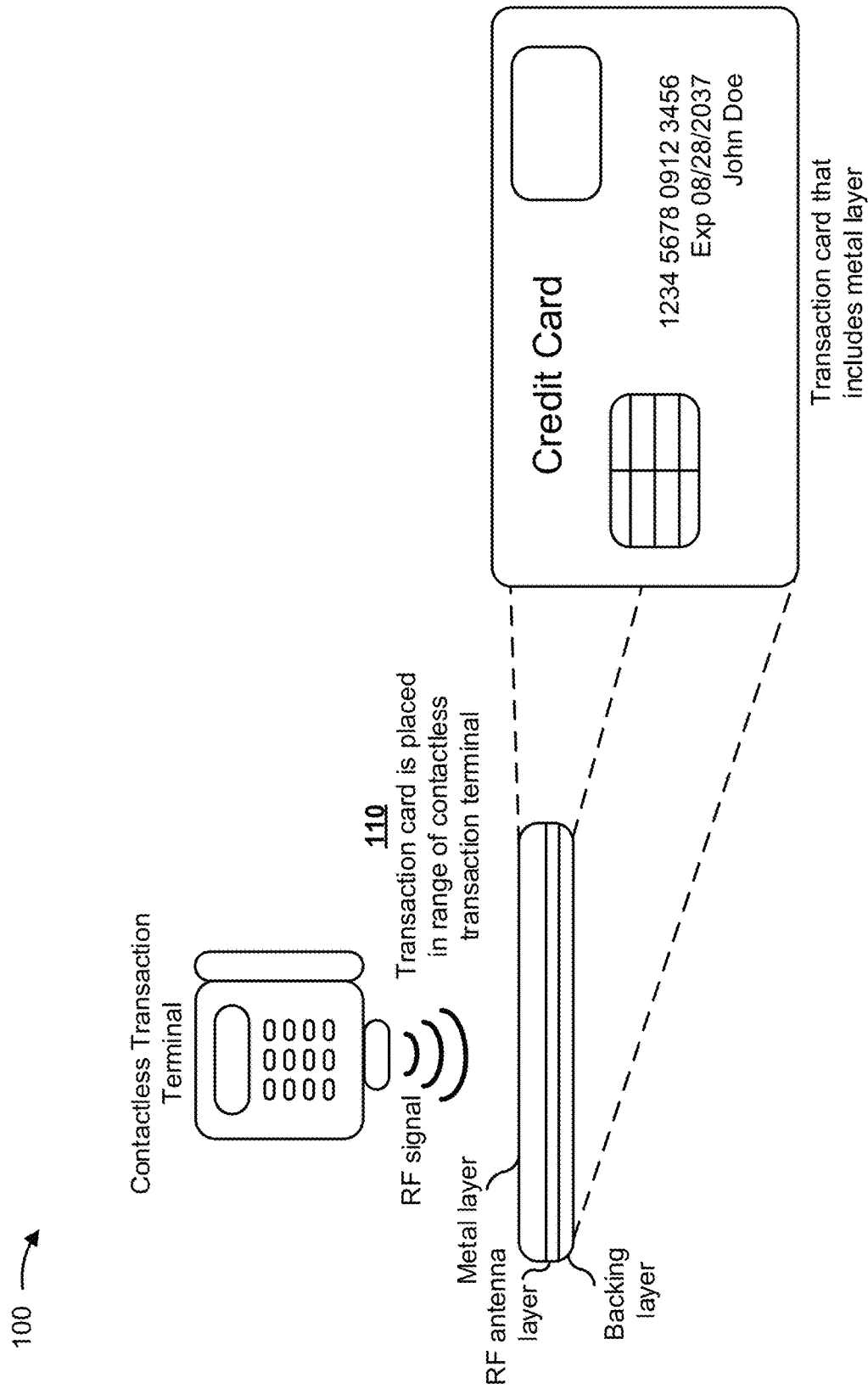
FIGS. 1A-1C are diagrams of an overview of an example implementation described herein.

The following detailed description of example implementations refers to the accompanying drawings. The same reference numbers in different drawings may identify the same or similar elements.

Transaction cards may be used to facilitate transactions at transaction terminals (e.g., point of sale (PoS) terminals, automated teller machine (ATM) terminals, access terminals (e.g., locking mechanisms for gates, doors, rooms, etc.), reward redemption terminals, and/or the like). Transaction cards may include components to enable contactless transactions. In many instances, transaction cards, which are capable of contactless transaction, are comprised primarily of plastic. The plastic causes little to no interference to the communication of data when performing a contactless action to communicate data to a transaction terminal (e.g., waving the transaction card). Recently, however, transaction cards are being made out of metal (e.g., a pure metal or metal alloy) or at least include a metal layer. In some instances, consumers may prefer metal transaction cards over plastic transaction cards because the metal transaction cards may be more durable and/or may have more desirable aesthetics (e.g., appearance, feel, etc.). However, the metal or metal layers in the transaction card may cause interference with radio frequency (RF) signals used in contactless transactions. For example, the metal layers may cause dense eddy currents to form from the RF signals, which prevents the RF antenna and/or contactless transaction terminal from providing and/or receiving data associated with the transaction card or a transaction. As used herein, a transaction may refer to an exchange of information or data (e.g., providing an access code or security key, providing account information, and/or the like), redeeming rewards or client loyalty rewards, earning rewards, an exchange or transfer of funds (e.g., a payment for goods or services), and/or the like.

Some implementations, disclosed herein, provide a transaction card with one or more metal layers that is capable of contactless transaction (i.e., a metal contactless transaction card). In some implementations, one or more metal layers of the transaction card may include a plurality of holes to lessen a density of eddy currents formed from an RF signal associated with an RF antenna. In some implementations, the plurality of holes may be configured to be located in the one or more metal layers corresponding to a location of the RF antenna in an RF antenna layer of the transaction card. According to some implementations, the plurality of holes may be configured in the one or more metal layers of the transaction card to maintain a threshold stiffness of the metal card and, thus, have a similar structural integrity as a standard metal transaction card. Accordingly, example implementations herein may enable a consumer to utilize contactless transaction with a metal card that may have substantially the same aesthetics (e.g., same appearance and/or same feel) and/or structural integrity as a standard metal transaction card.

Figure 1B:
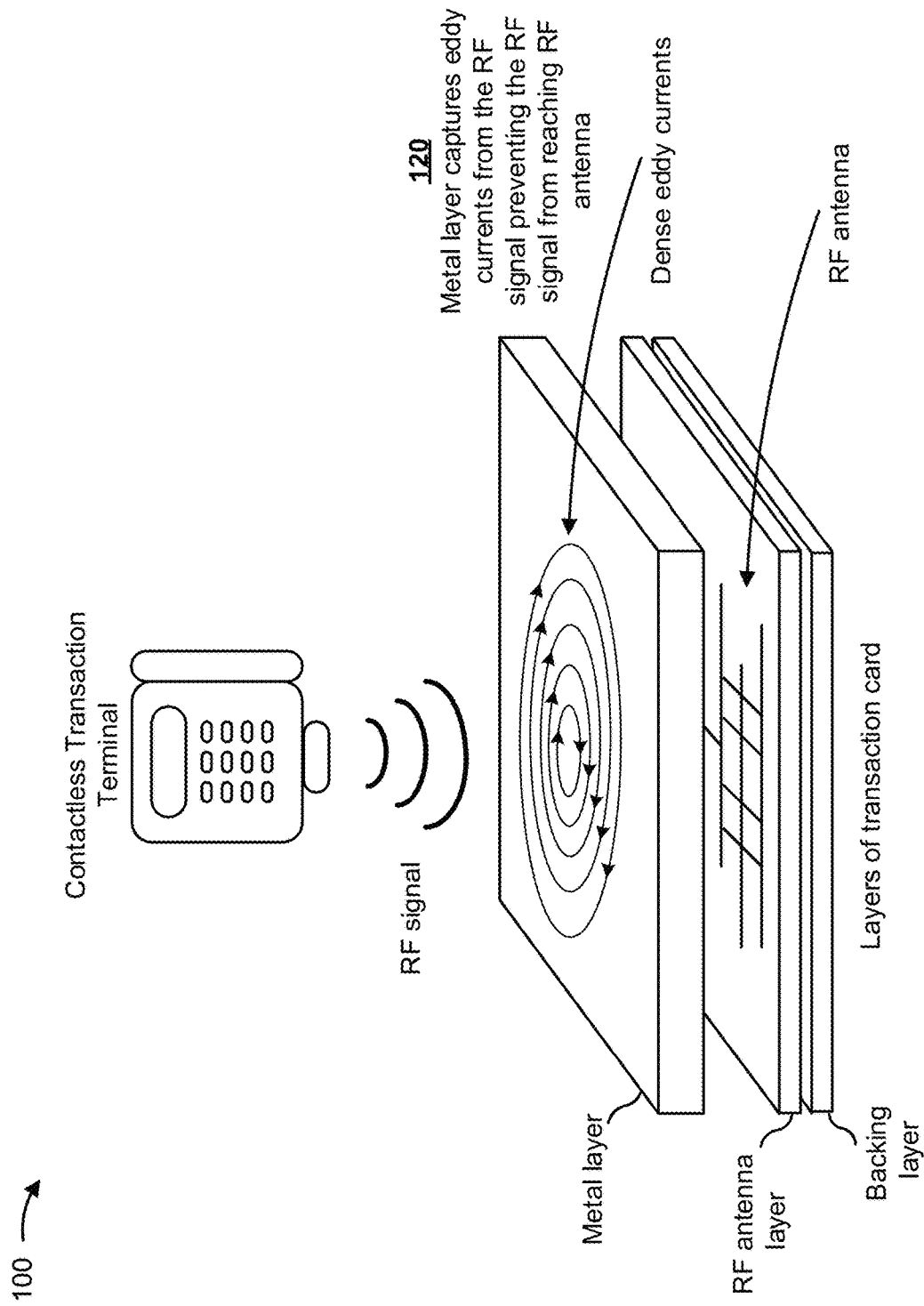
Figure 1C:
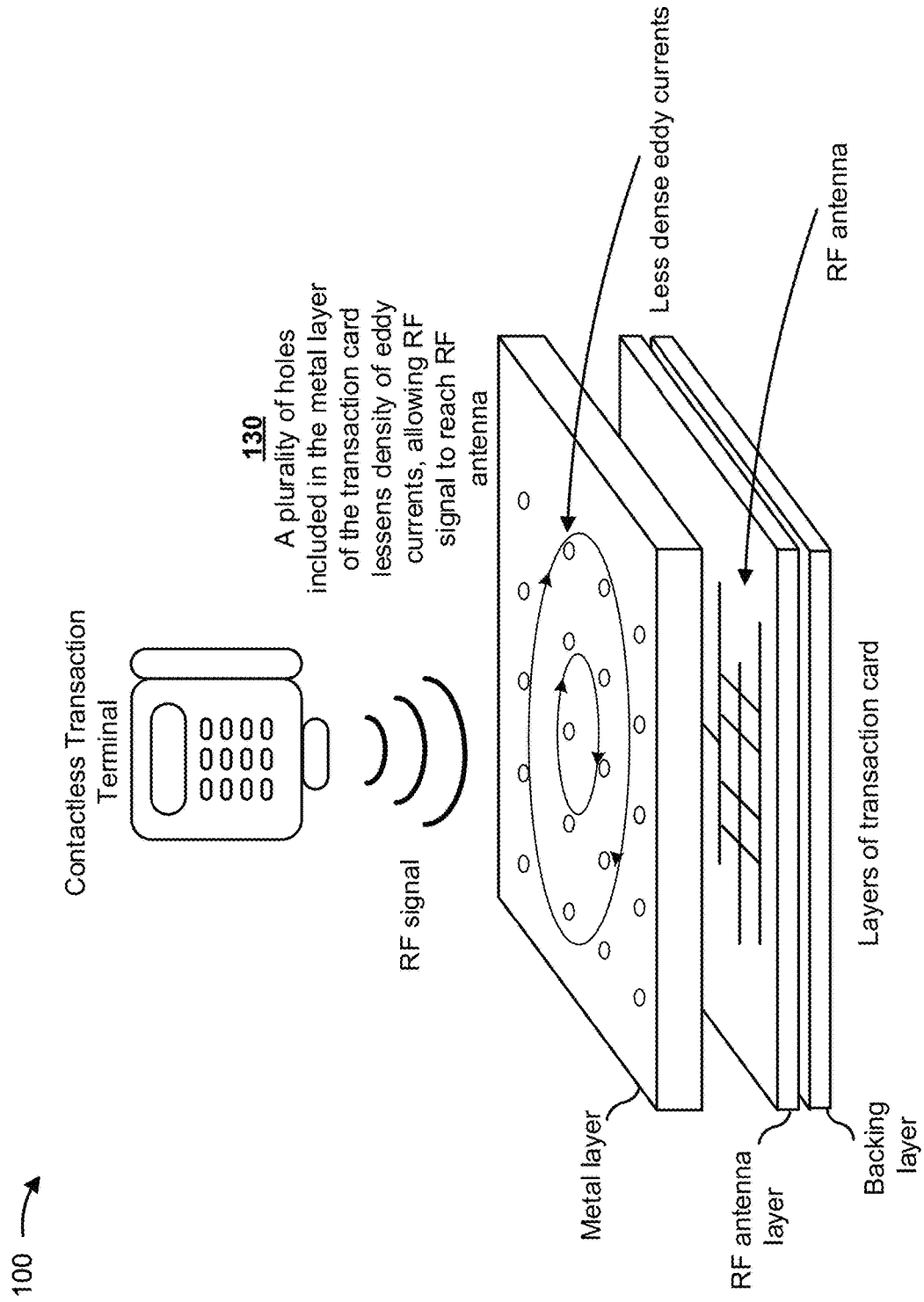

FIGS. 1A-1C are diagrams of an overview of an example implementation 100 described herein. In example implementation 100 of FIGS. 1A-1C a transaction card is provided for contactless transactions with a contactless transaction terminal (e.g., a point of sale (PoS) terminal). In FIGS. 1A-1C, the transaction card includes a metal layer, an RF antenna layer, and a backing layer.

As shown in FIG. 1A, and by reference number 110, the transaction card is placed in range of the contactless transaction terminal. For example, the transaction card may be placed in range by a consumer (e.g., an individual named John Doe as shown on the transaction card) waving the transaction card over or near the contactless transaction terminal. Accordingly, an RF antenna of the RF antenna layer of the transaction card is in range of the contactless transaction terminal such that the RF antenna may be capable of transmitting and/or receiving RF signals to and/or from the contactless transaction terminal.

As shown in FIG. 1B, and by reference number 120, the metal layer of the transaction card captures eddy currents from the RF signal, preventing the RF signal from reaching the RF antenna, and thus preventing the RF antenna from communicating data to the contactless transaction terminal. For example, the RF signal may be absorbed via the eddy currents and/or the eddy currents may cause interference that prevents the RF antenna from being able to read and/or detect the RF signal. As shown in FIG. 1B, dense eddy currents are present in the metal layer of the transaction card. Accordingly, the dense eddy currents prevent the RF antenna in the RF antenna layer from communicating data (e.g., account information, a payment token, and/or the like) associated with the transaction card to the contactless transaction terminal.

As shown in FIG. 1C, and by reference number 130, by including a plurality of holes in the metal layer of the transaction card, the density of the eddy currents can be reduced, thereby allowing the RF antenna to receive and/or transmit an RF signal. Accordingly, the transaction card of FIG. 1C is a different transaction card than the transaction card of FIG. 1B. The transaction card of FIG. 1C shows that eddy currents in the metal layer of the transaction card are less dense than the eddy currents in the transaction card of FIG. 1B. Furthermore, according to some implementations herein, the plurality of holes (and/or a pattern of the plurality of holes) may be configured to maintain the structural integrity of the transaction card while reducing the density of the eddy currents at the same time. For example, the transaction cart of FIG. 1C may have a threshold stiffness relative to the stiffness of the transaction card of FIG. 1B such that a difference in the stiffness between the transaction cards of FIGS. 1B and 1C is relatively unnoticeable.

As illustrated in example implementation 100 of FIGS. 1A-1C, a contactless transaction card with a metal layer including a plurality of holes may be provided to enable contactless transaction with a contactless transaction terminal. Therefore, some implementations herein improve wireless communications between the contactless transaction card and the contactless transaction terminal by reducing a density of eddy currents in the metal layer, while maintaining the structural integrity of the transaction card and/or aesthetics of the transaction card, relative to a metal transaction card that does not include the plurality of holes. Accordingly, some implementations herein may conserve resources (e.g., power, processing capabilities, and/or the like) of a contactless transaction terminal by reducing an amount of communication failures between a metal contactless transaction card and the transaction terminal.

As indicated above, FIGS. 1A-1C are provided merely as an example. Other examples are possible and may differ from what was described with regard to FIGS. 1A-1C.

Figure 2:
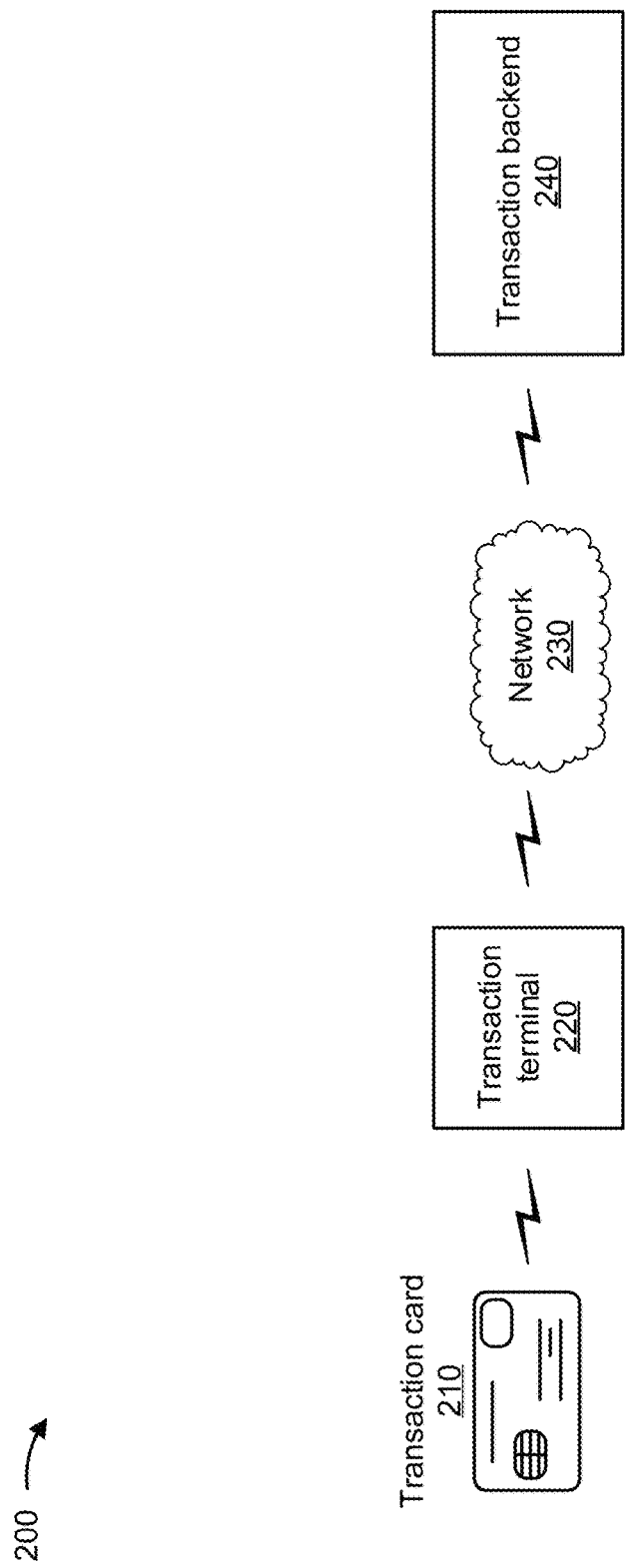
FIG. 2 is a diagram of an example environment in which devices and/or elements described herein, may be implemented.

FIG. 2 is a diagram of an example environment 200 in which devices described herein, may be implemented. As shown in FIG. 2, environment 200 may include a transaction card 210, a transaction terminal 220, a network 230, and a transaction backend 240. In environment 200, transaction card 210 may communicate data associated with or relating to a transaction with transaction terminal 220, which facilitates processing the transaction through communication with transaction backend 240 via network 230. Devices of environment 200 may interconnect via wired connections, wireless connections, or a combination of wired and wireless connections.

Transaction card 210 includes a transaction card with a metal layer containing a plurality of holes. Transaction card 210 is capable of storing and/or communicating data for a PoS transaction with transaction terminal 220. For example, transaction card 210 may store or communicate data including account information (e.g., an account identifier, a cardholder identifier, etc.), expiration information of transaction card 210, banking information, transaction information (e.g., a payment token), and/or the like. For example, to store or communicate the data, transaction card 210 may include a magnetic strip and/or an integrated circuit (IC) chip (e.g., a EUROPAY®, MASTERCARD®, VISA® (EMV) chip). Transaction card 210 may include an antenna to communicate data associated with transaction card 210. The antenna may be a passive RF antenna, an active RF antenna, and/or a battery-assisted RF antenna. In some implementations, transaction card 210 may be a smart transaction card, capable of communicating wirelessly (e.g., via Bluetooth, Bluetooth Low Energy (BLE), and/or the like) with a computing device, such as a smartphone, a digital wallet, and/or other device.

Transaction terminal 220 includes one or more devices capable of receiving, generating, storing, processing, and/or providing information associated with facilitating a transaction (a PoS transaction). For example, transaction terminal 220 may include a communication device and/or computing device capable of receiving data from transaction card 210 and/or processing a transaction based on the data. In some implementations, transaction terminal 220 may include a desktop computer, a laptop computer, a tablet computer, a handheld computer, and/or a mobile phone (e.g., a smart phone, a radiotelephone, etc.). Transaction terminal 220 may be owned and/or operated by one or more individuals or businesses engaged in a sale of goods or services (e.g., one or more merchants, vendors, service providers, and/or the like).

Transaction terminal 220 may include one or more devices to facilitate processing a transaction via transaction card 210. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or interaction or authorization from a cardholder of transaction card 210. Example input devices of transaction terminal 220 may include a number keypad, a touchscreen, a magnetic strip reader, a chip reader, and/or an RF signal reader. A magnetic strip reader of transaction terminal 220 may receive transaction card data as a magnetic strip of transaction card 210 is swiped along the magnetic strip reader. A chip reader of transaction terminal 220 may receive transaction card data from an IC chip (e.g., an EMV chip) of transaction card 210 when the chip is placed in contact with the chip reader. An RF signal reader of transaction terminal 220 may enable contactless transactions from transaction card 210 by obtaining transaction card data wirelessly from transaction card 210 as transaction card 210 comes within a range of transaction terminal 220 that the RF signal reader may detect an RF signal from an RF antenna of transaction card 210. Example output devices of transaction terminal 220 may include a display device, a speaker, a printer, and/or the like.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 240 includes one or more devices capable of authorizing and/or facilitating a transaction. For example, transaction backend 240 may include one or more servers and/or computers to store and/or provide information (e.g., authorizations, balances, payment tokens, security information, account information, and/or the like) associated with processing a transaction via transaction terminal 220.

Transaction backend 240 may include one or more devices associated with banks and/or transaction card associations that authorize the transaction and/or facilitate a transfer of funds or payments between an account of a cardholder of transaction card 210 and an account of an individual or business of transaction terminal 220. For example, transaction backend 240 may include one or more devices of one or more issuing banks associated with a cardholder of transaction card 210, one or more devices of one or more acquiring banks (or merchant banks) associated with transaction terminal 220, and/or one or more devices associated with one or more card associations (e.g., VISA®, MASTERCARD®, and/or the like) associated with transaction card 210. Accordingly, in response to receiving transaction card data associated with transaction card 210 from transaction terminal 220, various banking institutions and/or card associations of transaction backend 240 may communicate to authorize the transaction and/or transfer funds between the accounts associated with transaction card 210 and/or transaction terminal 220.

Transaction backend 240 may include one or more devices associated with security that may provide or deny authorization associated with the transaction. For example, transaction backend 240 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with transaction card 210 and/or provided by transaction terminal 220.

Transaction backend 240 may include one or more devices associated with a rewards program with transaction card 210 and/or an entity (e.g., a bank, a merchant, a service provider, a vendor, and/or the like) associated with the transaction card 210 and/or transaction terminal 220 and/or an entity associated with transaction terminal 220. For example, transaction backend 240 may authorize the earning and/or redemption of rewards (e.g., rewards points associated with transaction card 210, cash rewards, client loyalty rewards associated with an entity associated with transaction terminal 220, and/or the like) based on a transaction processed by transaction terminal 220 with transaction card 210.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
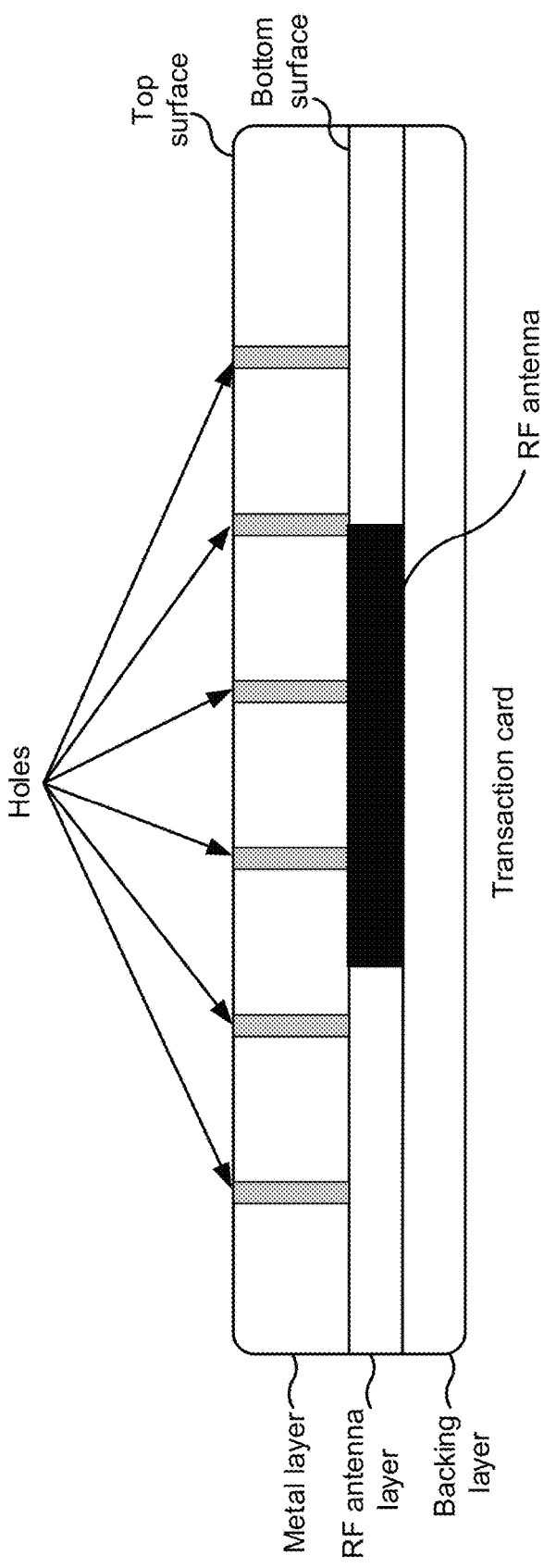
FIGS. 3-9 are diagrams of example implementations of a metal contactless transaction card described herein.

FIG. 3 is a diagram of an example implementation 300 of a metal contactless transaction card described herein. The transaction card, of example implementation 300 of FIG. 3, may correspond to transaction card 210. In FIG. 3, the transaction card is shown with a metal layer, an RF antenna layer, and a backing layer. In the example implementation of FIG. 3, the RF antenna layer is positioned between the metal layer and the backing layer of the transaction card.

As shown in FIG. 3, the RF antenna layer includes an RF antenna to facilitate communicating data relating to a transaction wirelessly via an RF signal (e.g., an RF signal communicated with transaction terminal 220). The metal layer, of the example implementation of FIG. 3, includes a plurality of holes (which may be referred to herein collectively as "the holes") to limit eddy currents (e.g., eddy currents caused by the RF signal) in the metal layer to a threshold density. For example, the threshold density may be a density that corresponds to a particular threshold of the amplitude of the RF signal. In some implementations, the threshold density may correspond to a percentage of a density of the eddy currents in the metal layer without the holes.

Furthermore, as shown in FIG. 3, the holes extend from a top surface of the metal layer to a bottom surface of the metal layer. In some implementations, the holes may not extend from the top surface of the metal layer to the bottom surface of the metal layer. For example, the holes may extend from the top surface to a middle plane of the metal layer that is between the top surface and the bottom surface of the metal layer. Additionally, or alternatively, the holes may extend from the bottom surface to the middle plane of the metal layer that is between the top surface and the bottom surface of the metal layer. In some implementations, the holes may include a subset of holes that extend from the top surface to the bottom surface of the metal layer, a subset of holes that extend from the top surface to the middle plane of the metal layer, and/or a subset of holes that extend from the bottom surface to the middle plane of the metal layer.

In some implementations, a threshold percentage (e.g., 50%, 80%, 100%, and/or the like) of the holes may include a dielectric. For example, the holes may be partially or entirely filled with a dielectric. More specifically, the holes may be filled with a nonconductive material such that a surface of the material in the holes is on plane (within a tolerance range) with the top surface of the metal layer. In some implementations, an identification film may be included over the top surface of the metal layer. For example, the identification film may include identification information associated with the transaction card, such as a cardholder's name, an account number, an expiration date, a bank identifier, a card association identifier, and/or the like. Accordingly, the identification film may be included and/or added to provide an aesthetic look and indicate information associated with the transaction card.

In some implementations, the holes may be etched and/or drilled into the metal layer of the transaction card of FIG. 3. For example, the holes in the metal layer of example implementation 300 may be formed using a die cut process, a microcomputer numerical control (micro CNC) process, and/or a drill press. In some implementations, each of the holes or some of the holes (or at least the openings of the holes on the top surface) may have substantially a same shape (e.g., triangular, circular (cylindrical), square, rectangular, polygonal, and/or the like) and/or size. In some implementations, each of the holes or some of the holes (or at least the openings of the holes on the top surface) may have substantially a different shape and/or size. In some implementations, the holes may be equal to or less than one tenth of an inch (or less than approximately 3/32 of an inch or 2.3 millimeters (mm)) wide (e.g., may have a diameter of less than one tenth of an inch (or less than 2.3 mm)).

The holes, in example implementation 300 of FIG. 3, may be positioned in a specified pattern. For example, the holes may be positioned in a specific pattern (e.g., a random pattern, a symmetrical pattern, etc.) associated with a particular symbol, image, icon, shape, and/or the like. In some implementations, the holes may be positioned in a specified pattern to maintain a threshold stiffness of the metal layer to provide structural integrity to the transaction card. For example, a threshold stiffness may correspond to a percentage of the stiffness of the metal layer (or transaction card) if the holes were not included in the metal layer. Furthermore, in some implementations, the holes may be positioned in a specified pattern that corresponds to a layout of the RF antenna layer. For example, the holes may be distributed throughout the metal layer to match a layout of the RF antenna in the RF antenna layer and/or to match a location of the RF antenna of the RF antenna layer.

In some implementations, a layout of the holes may be designed based on the layout of the RF antenna and/or RF antenna layer. Such a layout may be designed based on the design or characteristics of the RF antenna (e.g., active, passive, or battery assisted), characteristics of the RF antenna layer, characteristics of the metal layer (e.g., a type of metal, a type of metal alloy, or dimensions of the metal layer), dimensions of the transaction card, and/or the like. In some implementations, the holes may be positioned in a determined optimal layout designed to limit eddy currents to an optimal threshold density (e.g., a density less than the threshold density, such as a lowest possible eddy current density). As used herein, an optimal layout and/or optimal threshold density are considered optimal relative to the design analysis used to design the layout. In some implementations, simulations can be done to determine the optimal layout. For example, the holes can be moved and/or positioned, the eddy currents may then be determined based on the position of the holes and/or the structural integrity of the metal layer (and/or transaction card) may be determined based on the position of the holes. Further, the above may be repeated until an optimal layout of the holes (e.g., a combination of lowest eddy currents and best structural integrity) is found.

Accordingly, a transaction card with a metal layer is provided that communicates data relating to a transaction with a transaction terminal (e.g., transaction terminal 220) while limiting eddy currents in the metal layer to a threshold density. Furthermore, some implementations herein maintain structural integrity of the transaction card by positioning a plurality of holes in specified locations (or in a specified pattern) throughout the metal layer.

As indicated above, FIG. 3 is provided merely as an example. Other examples are possible and may differ from what was described with regard to FIG. 3.

Figure 4:
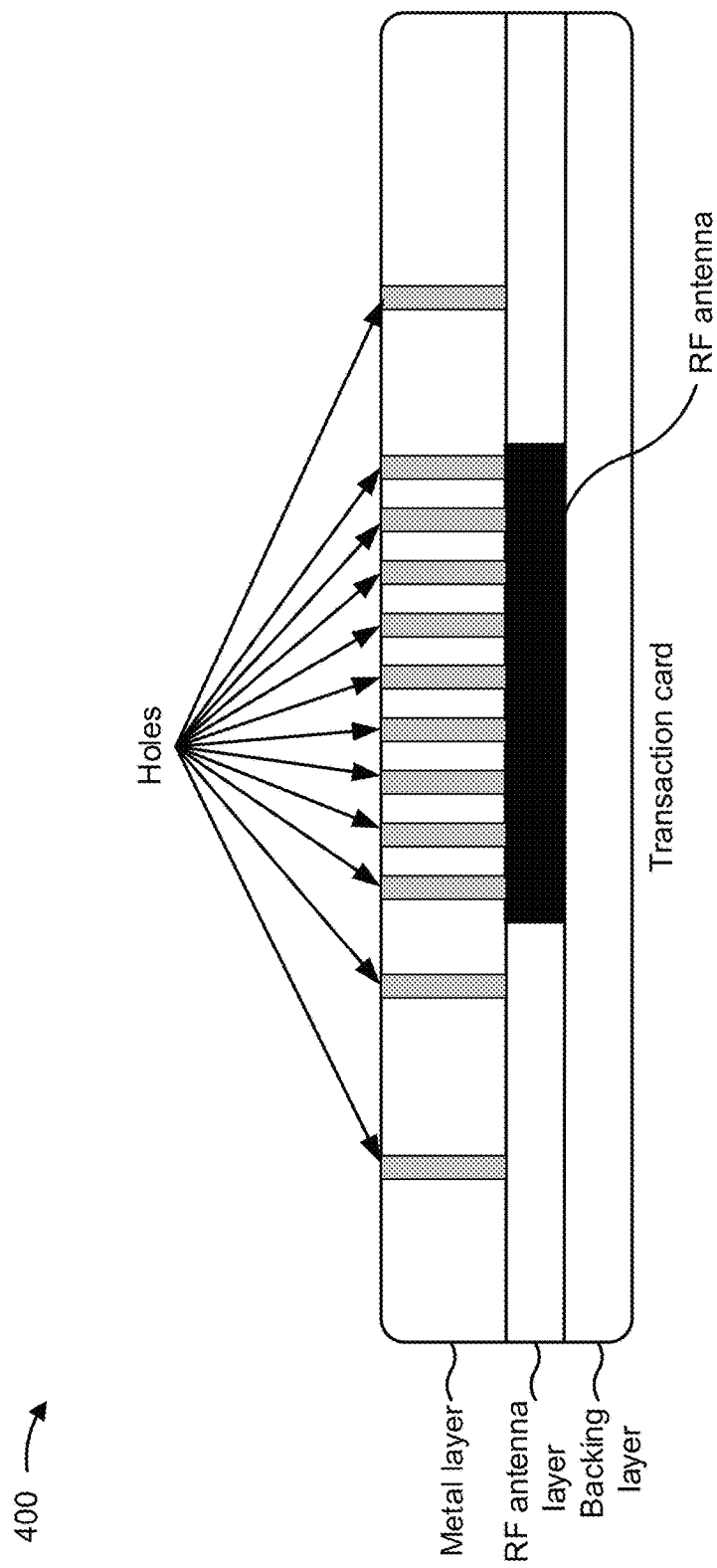

FIG. 4 is a diagram of an example implementation 400 of a metal contactless transaction card described herein. The transaction card of example implementation 400 of FIG. 4 may correspond to transaction card 210. Similar to FIG. 3, in FIG. 4, the transaction card is shown with an RF antenna layer positioned between the metal layer and the backing layer of the transaction card.

In example implementation 400 of FIG. 4, a majority of the holes may be positioned in the metal layer in an area that corresponds to a position of the RF antenna in the RF antenna layer. For example, the holes may be positioned to overlap the RF antenna. The greater density of the holes lessens the density of the eddy currents in the transaction card. Accordingly, eddy currents may be less dense in the area of the metal layer that is adjacent the RF antenna. Accordingly, a greater density of a subset of the holes of the plurality of holes may be closer to an area of the metal layer that overlaps the RF antenna and a lesser density of a subset of the holes may be further from the area that overlaps the RF antenna. Therefore, the transaction card of example implementation 400 may facilitate communicating data associated with a transaction with a transaction terminal (e.g., transaction terminal 220).

As indicated above, FIG. 4 is provided merely as an example. Other examples are possible and may differ from what was described with regard to FIG. 4.

Figure 5:
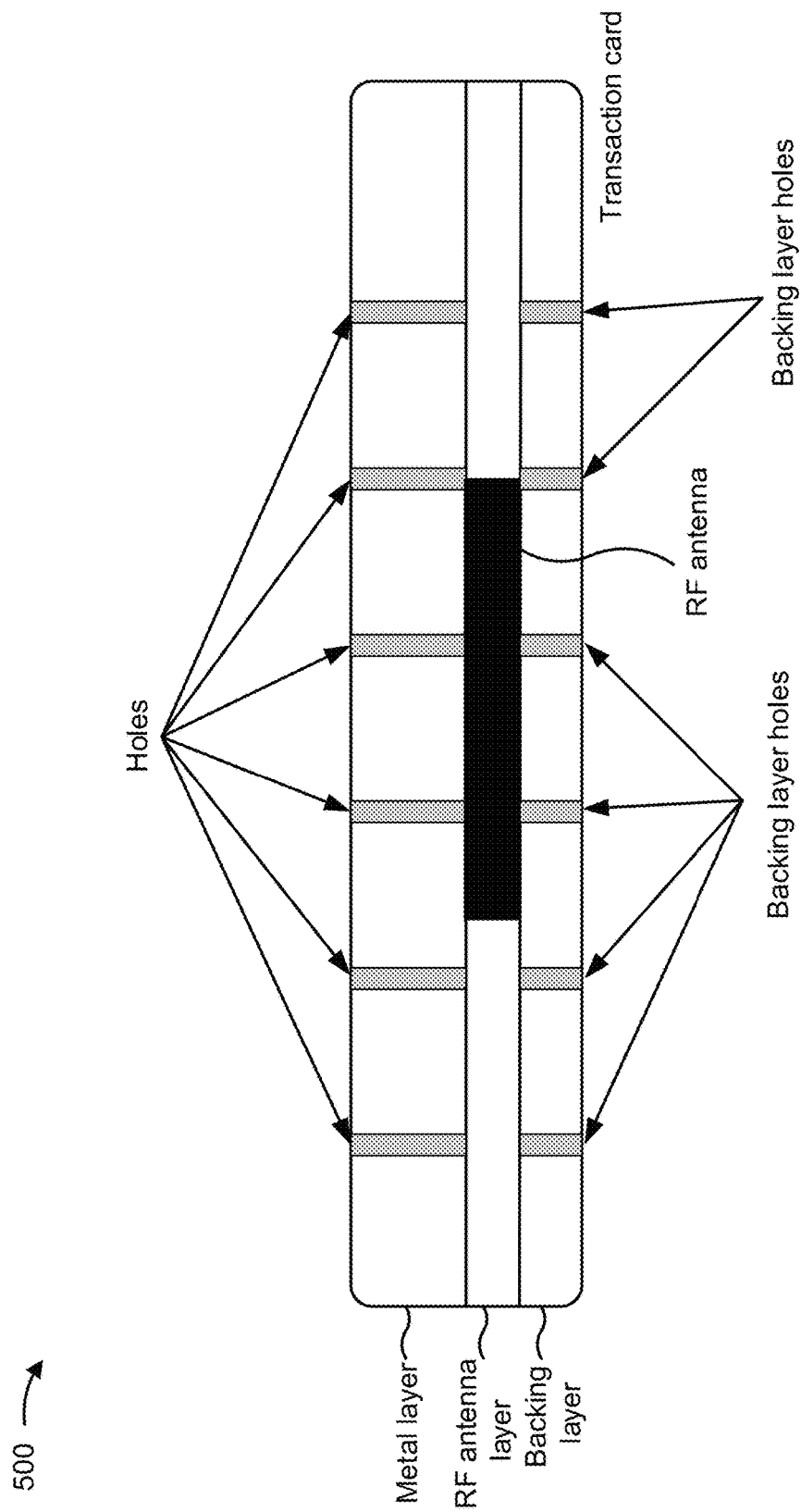

FIG. 5 is a diagram of an example implementation 500 of a metal contactless transaction card described herein. The transaction card of example implementation 500 of FIG. 5 may correspond to transaction card 210. Similar to FIGS. 3 and 4, in FIG. 5, the transaction card is shown with an RF antenna layer positioned between the metal layer and the backing layer of the transaction card. In example implementation 500, the backing layer may be comprised of a metal or primarily of a metal.

In example implementation 500 of FIG. 5, the backing layer includes a plurality of holes (labeled as backing layer holes). As shown, the backing layer holes overlap the holes of the metal layer. For example, the holes of the metal layer and the backing layer holes may be positioned to match one another (within a tolerance range) relative to the layout or dimensions of the transaction card of example implementation 500. In some implementations, a subset of holes of the metal layer may overlap a subset of the backing layer holes, while another subset of the holes of the metal layer do not overlap another subset of the backing layer holes. According to some implementations, the backing layer holes may be positioned in a specified pattern similar to the holes of the metal layer. The specified pattern of the backing holes may match or not match the specified pattern of the holes of the metal layer.

In some implementations, the backing layer holes may or may not be a same size and/or shape as the holes of the metal layer. Additionally, alternatively, the a subset of the backing layers holes may be a same size and/or shape as some of holes of the metal layer and another subset of the backing layer holes may not be the same size and/or shape as some of the holes of the metal layer. Furthermore, a density of the backing layer holes may or may not match a density of the holes of the metal layer. In some implementations, a quantity of the backing layer holes may or may not match a quantity of the holes of the metal layer.

Accordingly, the transaction card of example implementation 500 may wirelessly communicate data relating to a transaction while limiting eddy currents in the metal layer and/or in the metal backing layer of the transaction card. Furthermore, the metal backing layer of example implementation 500 may provide additional stiffness and/or increase a structural integrity of the transaction card relative to the backing layer being a plastic or other non-metallic material.

As indicated above, FIG. 5 is provided merely as an example. Other examples are possible and may differ from what was described with regard to FIG. 5.

Figure 6:
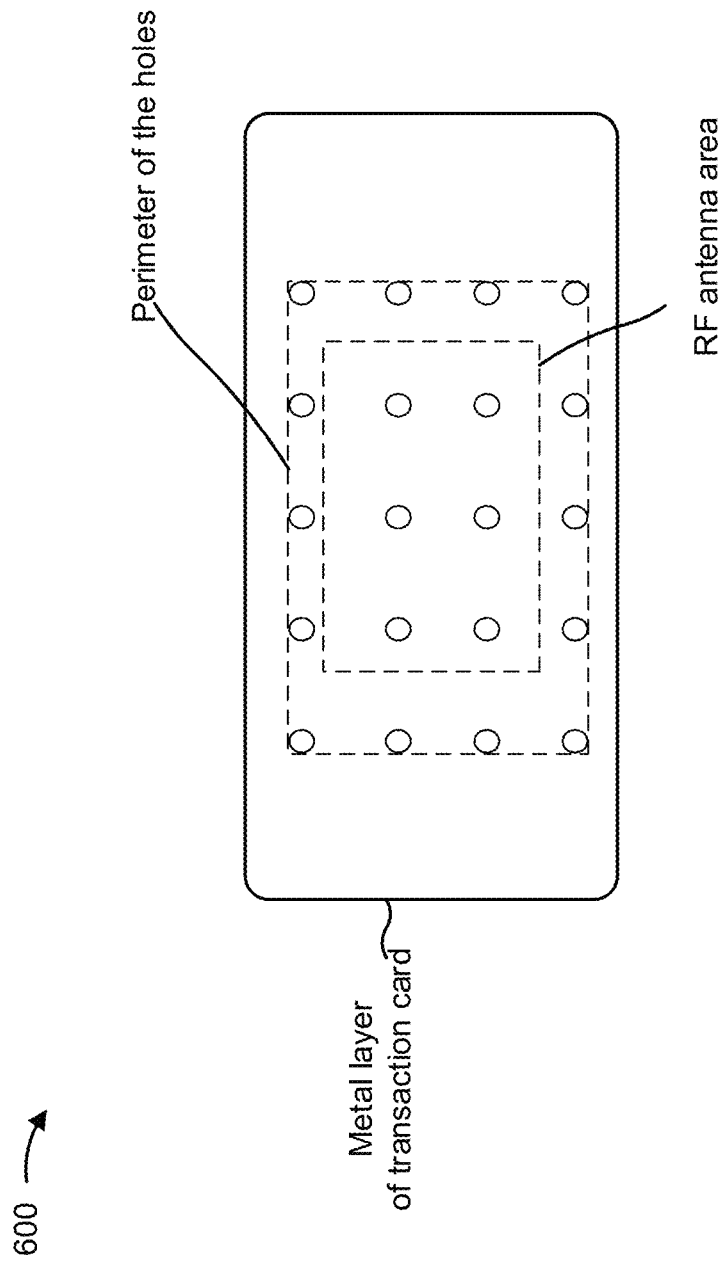

FIG. 6 is a diagram of an example implementation 600 of a metal contactless transaction card described herein. As shown in FIG. 6, a plurality of holes are included in a metal layer. The metal layer of example implementation 600 may be a metal layer of transaction card 210. In FIG. 6, a perimeter of the holes that defines an area of the holes in example implementation 600 is shown. In some implementations, the area of the holes defined by the perimeter of the holes may be a threshold area of the metal layer (and/or the transaction card). For example, the area of the holes may be at least 50% (or 75% or 95%, etc.) of the area of the metal layer (and/or of the transaction card). In some implementations, a combined surface area of the holes may be a threshold area of an area of the metal layer defined by the perimeter of the holes. For example, a total of the surface areas of the holes in example implementation 600 is to be at least 10% (or 20% or 30%) of the area of the perimeter of the holes.

Furthermore, the holes of example implementation 600 are shown in a specified shape (i.e., a rectangular shape). As shown, the holes may be equidistant from one another in the particular shape. In some implementations, distances between holes in a particular shape may increase or decrease based on a density of the holes within the pattern, though the pattern may maintain the specified shape. In some implementations, the holes of the metal layer may not be evenly distributed. In some implementations, the holes may appear to have a random pattern.

In some implementations, the position of the holes in the metal layer of example implementation 600 may be positioned without regard to the RF antenna area. Accordingly, the layout of the holes may not depend on the layout of the RF antenna and/or the RF antenna layer.

Accordingly, a pattern of holes in a metal layer of a transaction card may enable the transaction card to wirelessly communicate data associated with a transaction with a transaction terminal processing the transaction.

As indicated above, FIG. 6 is provided merely as an example. Other examples are possible and may differ from what was described with regard to FIG. 6.

Figure 7:
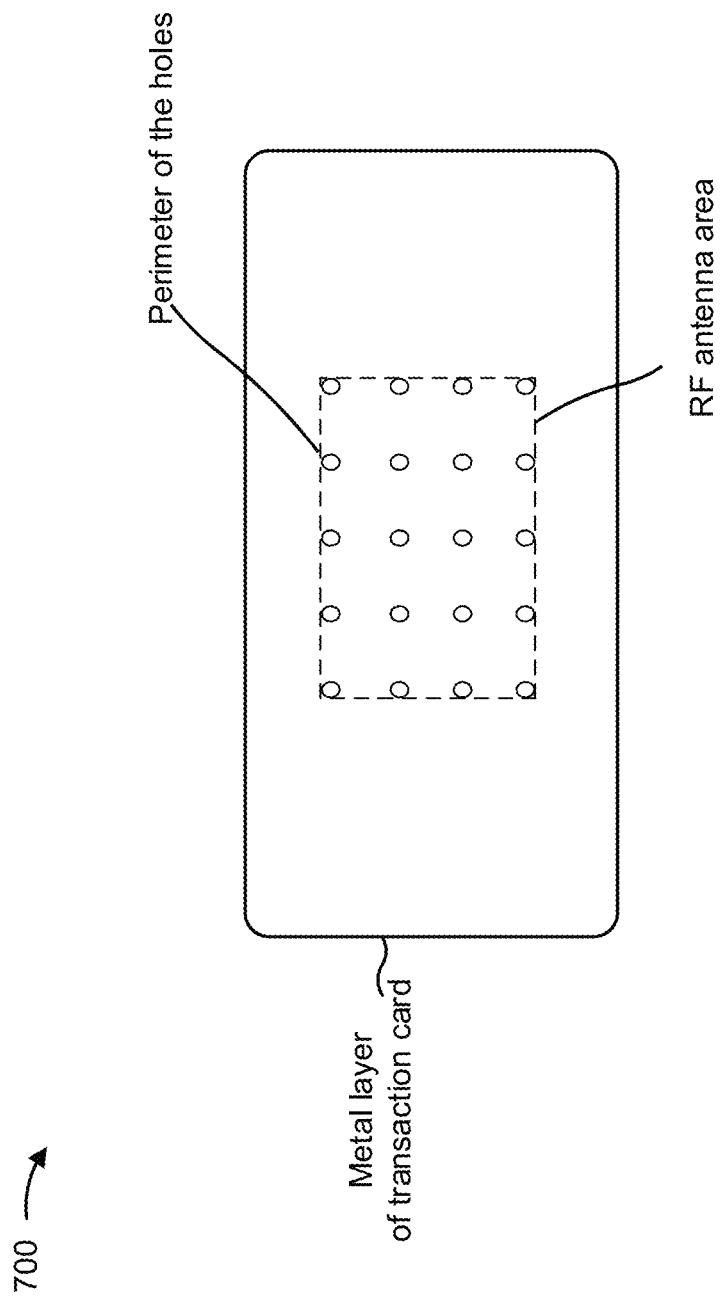

FIG. 7 is a diagram of an example implementation 700 of a metal contactless transaction card described herein. As shown in FIG. 7, a plurality of holes are included in a metal layer. The metal layer of example implementation 700 may be a metal layer of transaction card 210. In FIG. 7, a perimeter of the holes that defines an area of the holes in example implementation 700 is shown. As shown, the holes are positioned in the metal layer such that the perimeter of the area of the holes overlaps a perimeter of the RF antenna in the RF antenna layer. In some implementations, the perimeter of the area of the holes (or the area of the holes) may be less than or greater than the perimeter of the area of the RF antenna (or the area of the RF antenna).

Accordingly, a pattern of holes in a metal layer that is based on a location of an RF antenna of a transaction card may enable the transaction card to wirelessly communicate data associated with a transaction with a transaction terminal processing the transaction.

As indicated above, FIG. 7 is provided merely as an example. Other examples are possible and may differ from what was described with regard to FIG. 7.

Figure 8:
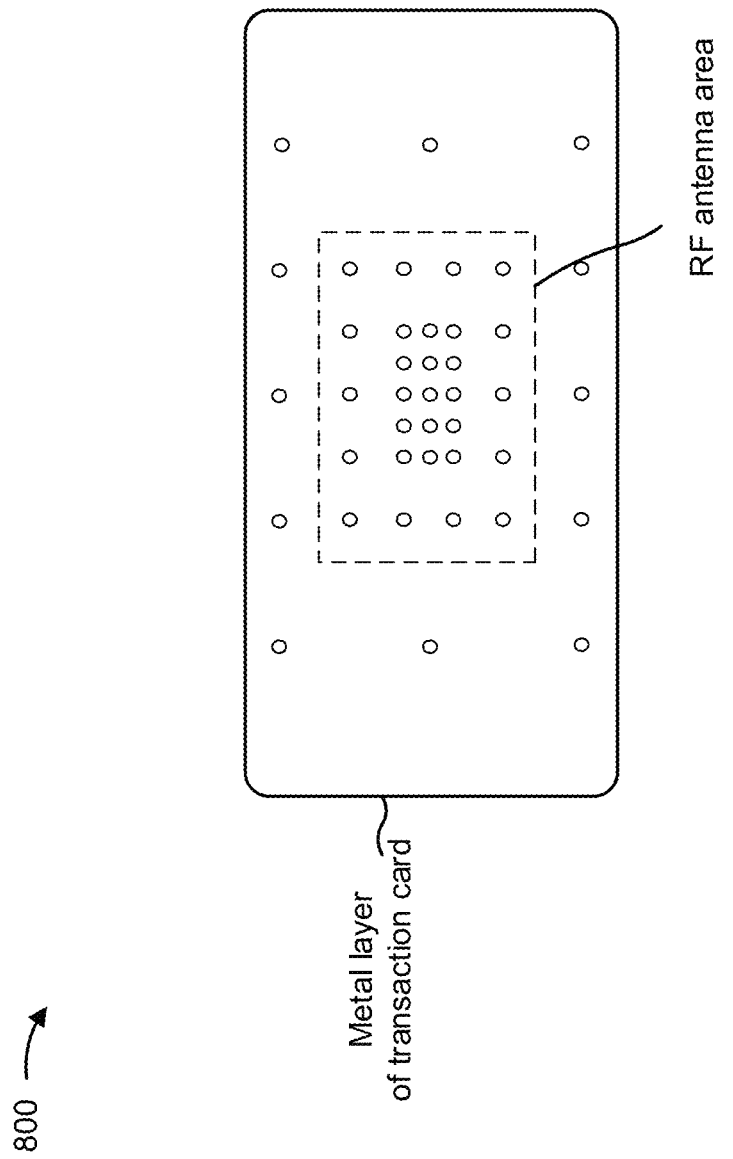

FIG. 8 is a diagram of an example implementation 800 of a metal contactless transaction card described herein. As shown in FIG. 8, a plurality of holes are included in a metal layer. The metal layer of example implementation 800 may be a metal layer of transaction card 210. In FIG. 8, an RF antenna area is shown. Further, as shown, the holes are positioned in a specified pattern in which the holes are more densely positioned over the RF antenna area and less densely positioned in the area outside of the RF antenna layer. Accordingly, a first subset of the holes are positioned in a greater density over the RF antenna in the RF antenna layer than a second subset of the holes that are not positioned over the RF antenna in the RF antenna layer. In some implementations, the pattern may include a greater density of holes closer to the center of the RF antenna area and a lesser density of holes farther from the center of the RF antenna area. In some implementations, the pattern of the holes may be dependent on a configuration or design of the RF antenna, as shown in FIG. 8.

Accordingly, a pattern of holes in a metal layer that is based on a location and/or configuration of an RF antenna of a transaction card may enable the transaction card to wirelessly communicate data associated with a transaction with a transaction terminal processing the transaction.

As indicated above, FIG. 8 is provided merely as an example. Other examples are possible and may differ from what was described with regard to FIG. 8.

Figure 9:
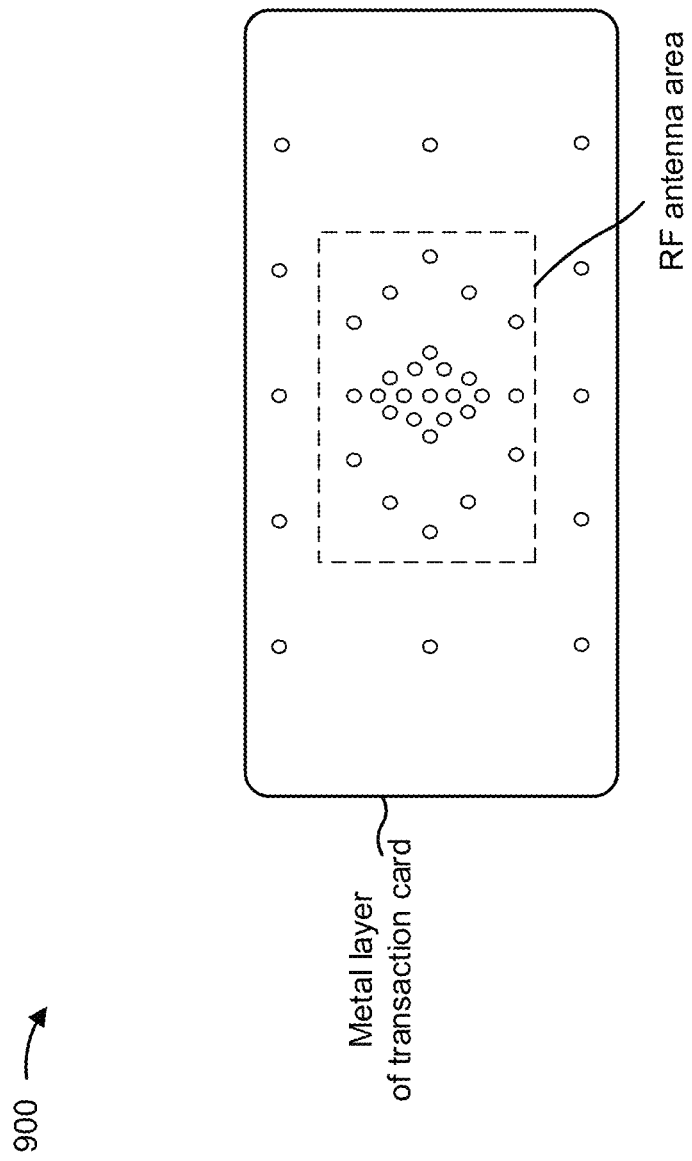

FIG. 9 is a diagram of an example implementation 900 of a metal contactless transaction card described herein. As shown in FIG. 9, a plurality of holes are included in a metal layer. The metal layer of example implementation 900 may be a metal layer of transaction card 210. In FIG. 9, an RF antenna area is shown. Further, as shown, the holes are positioned in specified patterns in which the holes outside of the RF antenna are positioned in a first pattern (e.g., a rectangle) and the holes inside the RF antenna area are positioned in diamond (or arrow) patterns that get more dense as the pattern approaches the center of the RF antenna area.

Accordingly, a plurality of patterns of holes in a metal layer that are based on a location of an RF antenna of a transaction card may enable the transaction card to wirelessly communicate data associated with a transaction with a transaction terminal processing the transaction.

As indicated above, FIG. 9 is provided merely as an example. Other examples are possible and may differ from what was described with regard to FIG. 9.

According to some implementations herein, a metal, contactless transaction card is provided with a plurality of holes in one or more metal layers of the transaction card. The plurality of holes in the metal layer limit eddy currents in the metal layer to a threshold density. Accordingly, the eddy currents in the metal layer of the transaction card are too weak to interfere with an RF signal used for communicating data associated with the transaction card with a transaction terminal. Furthermore, the plurality of holes may be positioned in a pattern to maintain the aesthetics and structural integrity of the transaction card relative to a metal transaction card that does not include the plurality of holes.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction card for communicating data relating to a transaction, the transaction card comprising:
    a metal layer;
    a backing layer; and
    a radio frequency (RF) antenna layer positioned between the metal layer and the backing layer,
    where
        the RF antenna layer includes an RF antenna to facilitate communicating the data relating to the transaction wirelessly via an RF signal,
        the metal layer comprises a plurality of holes,
            the plurality of holes extending from a top surface of the metal layer or a bottom surface of the metal layer to a middle plane of the metal layer that is between the top surface and the bottom surface.

2. The transaction card of claim 1, where the plurality of holes are configured to exhibit properties of drilled holes.

3. The transaction card of claim 1, where the plurality of holes are configured to exhibit properties of holes formed using a die cut process, a microcomputer numerical control process, or etching process.

4. The transaction card of claim 1, where an area of the metal layer defined by a perimeter of the plurality of holes comprises a threshold area of the metal layer.

5. The transaction card of claim 1, where a threshold percentage of holes of the plurality of holes comprise a dielectric material.

6. The transaction card of claim 1, where the backing layer is comprised of a metal,
    and
    where the backing layer comprises another plurality of holes.

7. The transaction card of claim 1, where an opening of each of the plurality of holes is entirely surrounded by the top surface of the metal layer.

8. The transaction card of claim 1, where a subset of holes, of the plurality of holes, are filled with a dielectric material, and
    where a surface of the dielectric material in the subset of holes is on a plane with the top surface of the metal layer.

9. A transaction card, the transaction card comprising:
    a metal layer; and
    a radio frequency (RF) antenna layer positioned adjacent to the metal layer,
    where
        the RF antenna layer includes an RF antenna to facilitate communication via an RF signal,
        the metal layer comprises a plurality of holes,
            the plurality of holes extending from a top surface of the metal layer or a bottom surface of the metal layer to a middle plane of the metal layer that is between the top surface and the bottom surface.

10. The transaction card of claim 9, where the plurality of holes are configured to limit eddy currents in the metal layer to a threshold density.

11. The transaction card of claim 9, wherein each of the plurality of holes is less than or equal to 2.3 millimeters wide.

12. The transaction card of claim 9, further comprising:
    an identification film, which indicates identification information, provided over the top surface of the metal layer.

13. The transaction card of claim 9, where each of the plurality of holes has a triangular shape.

14. The transaction card of claim 9, where each of the plurality of holes has a circular shape.

15. The transaction card of claim 9, where each of the plurality of holes has a square, a rectangular, or a polygonal shape.

16. The transaction card of claim 9, where a threshold quantity of the plurality of holes are filled with a dielectric material.

17. A transaction card for communicating data relating to a transaction, the transaction card comprising:
    a metal layer; and
    a backing layer; and a radio frequency (RF) antenna layer positioned between the metal layer and the backing layer,
where
the RF antenna layer includes an RF antenna to facilitate communicating the data relating to the transaction wirelessly via an RF signal,
the metal layer comprises a plurality of holes,
the plurality of holes extending from a top surface of the metal layer or a bottom surface of the metal layer to a middle plane of the metal layer that is between the top surface and the bottom surface, and
a threshold quantity of the plurality of holes are filled with a dielectric.

18. The transaction card of claim 17, where
the plurality of holes are positioned in a pattern,
where the pattern includes a greater density of a subset of holes, of the plurality of holes, closer to an area, of the metal layer, that overlaps the RF antenna and a lesser density of another subset of holes, of the plurality of holes, that are further from the area that overlaps the RF antenna.

19. The transaction card of claim 17,
where the holes filled with the dielectric are entirely filled with the dielectric.

20. The transaction card of claim 17, where an area defined by a perimeter of the plurality of holes overlaps an area defined by a perimeter of another plurality of holes in the backing layer.

21. The transaction card of claim 20, where the RF antenna is situated between the area defined by the perimeter of the plurality of holes and the area defined by the perimeter of the other plurality of holes.

* * * * *